United States Patent
Jia et al.

(10) Patent No.: US 11,307,541 B2
(45) Date of Patent: Apr. 19, 2022

(54) DECISION SUPPORT METHOD AND APPARATUS FOR MACHINERY CONTROL

(71) Applicant: INTELLIGENT FUSION TECHNOLOGY, INC., Germantown, MD (US)

(72) Inventors: Bin Jia, Germantown, MD (US); Jiaoyue Liu, Germantown, MD (US); Huamei Chen, Germantown, MD (US); Genshe Chen, Germantown, MD (US); Kuo-Chu Chang, Fairfax, VA (US); Thomas M. Clemons, III, Annandale, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 432 days.

(21) Appl. No.: 16/562,657

(22) Filed: Sep. 6, 2019

(65) Prior Publication Data
US 2021/0103256 A1 Apr. 8, 2021

(51) Int. Cl.
*G06N 20/00* (2019.01)
*G06K 9/62* (2006.01)
(Continued)

(52) U.S. Cl.
CPC ......... *G05B 13/0265* (2013.01); *G06F 40/10* (2020.01); *G06K 9/6232* (2013.01); *G06N 5/02* (2013.01); *G06N 7/005* (2013.01)

(58) Field of Classification Search
CPC ........ G06Q 50/01; G06N 5/022; G06N 20/00; G06N 3/0454; G06N 3/006; G06N 3/084; G05B 13/0265; G06F 16/9535; G06F 16/245; G06F 16/24575; H04L 47/70; H04L 63/10
See application file for complete search history.

(56) References Cited

U.S. PATENT DOCUMENTS

2021/0075805 A1* 3/2021 Cavallari .............. G06F 21/552

OTHER PUBLICATIONS

Jia et al., Pattern Discovery and Anomaly Detection via Knowledge Graph, 8 pages (Year: 2018).*

* cited by examiner

*Primary Examiner* — Thuy Dao
(74) *Attorney, Agent, or Firm* — Anova Law Group, PLLC

(57) ABSTRACT

A decision support method for machinery control includes extracting entities and relations from information sources, and creating subject-predicate-object (SPO) triples. Each SPO triple includes a subject entity and an object entity, and a relation between the subject entity and the object entity. The method further includes constructing a knowledge graph (KG) based on the SPO triples. The KG includes a plurality of nodes corresponding to the entities, and a plurality of links corresponding to the relations between the entities. The method also includes predicting missing links between the nodes and adding the predicted links to the KG, and performing diagnostic and prognostic analysis using the KG, including analyzing plain text description of MCS situations to obtain relevant information concerning key components from the KG, recognizing sensor observations and component conditions to diagnose situations of other related components, and providing prognostics by analyzing the present trending/symptom in the MCS operating process.

13 Claims, 8 Drawing Sheets

(51) Int. Cl.
*G06N 5/04* (2006.01)
*G06N 5/02* (2006.01)
*G06N 3/08* (2006.01)
*G06Q 10/06* (2012.01)
*G05B 13/02* (2006.01)
*G06F 40/10* (2020.01)
*G06N 7/00* (2006.01)

DECISION SUPPORT METHOD AND APPARATUS FOR MACHINERY CONTROL

GOVERNMENT RIGHTS

This invention was made with Government support under Contract No. N68335-18-C-0691, awarded by the United States Naval Air Warfare Center. The U.S. Government has certain rights in this invention.

FIELD OF THE DISCLOSURE

The present disclosure generally relates to the field of artificial intelligence (AI) technology and, more particularly, relates to a decision support method and apparatus for machinery control.

BACKGROUND

Modern machinery control system is designed with an ever-increasing level of automation and advanced machinery including state-of-the-art sensors that monitor vital components and auxiliary system functions. However, anomalous circumstances could disrupt the systems and present serious challenges to the operators. New diagnostic tools and technologies are therefore needed to augment the current machinery control system (MCS) and help improve situational awareness.

While major advances have been achieved in autonomy and augmented intelligence, additional work is required to develop new tools for situational awareness to produce faster and better decisions. To support decision making, a representation and reasoning engine are developed based on the state-of-the-art knowledge graph (KG) framework. With a capability to represent and reason about the semantics context in the data, the proposed KG approach can incorporate various fusion technologies for analysis of unstructured data (text, images, etc.) and structured data (signal feeds, database items, etc.) for diagnostic and prognostic purpose. Specifically, a general and configurable KG framework that can be integrated and applied to specific operational MCS systems is developed. The ultimate goal is to enhance state and situational awareness for machinery control operations with advanced cognitive-based machine learning and data analytics methods.

BRIEF SUMMARY OF THE DISCLOSURE

The present disclosure provides a decision support system including a decision support method and an apparatus for machinery control. The decision support method includes extracting a plurality of entities from information sources; extracting a plurality of relations between the plurality of entities from the information sources; and creating a plurality of subject-predicate-object (SPO) triples. Each SPO triple of the plurality of SPO triples includes a subject entity, an object entity, and a relation between the subject entity and the object entity. The plurality of entities extracted from the information sources includes the subject entity and the object entity. The method further includes constructing a knowledge graph (KG) based on the plurality of SPO triples. The KG includes a plurality of nodes corresponding to the plurality of entities extracted from the information sources, and a plurality of links corresponding to the plurality of relations between the plurality of entities. The method also includes predicting missing links between the plurality of nodes and adding the predicted missing links to the KG, and performing diagnostic and prognostic analysis using the KG, including analyzing plain text description of MCS situations to obtain the relevant information concerning key components from KG, recognizing the sensor observations and component conditions to diagnose the situation of other related components and providing the prognostics by analyzing the present trending/symptom in MCS operating process.

Another aspect of the present disclosure provides an apparatus. The apparatus includes a processor, a transceiver, a memory, and a data storage. The memory is configured to store computer-executable instructions, the data storage is configured to store collected knowledge graph data, i.e. SPO triples dataset; the transceiver is configured to realize communication between the apparatus and other communication entities; the processor is coupled to the memory through a bus; and when the apparatus operates, the processor executes the computer-executable instructions stored by the memory to implement a decision support method supported by the knowledge base in data storage for machinery control, including extracting a plurality of entities from information sources; extracting a plurality of relations between the plurality of entities from the information sources; and creating a plurality of SPO triples. Each SPO triple of the plurality of SPO triples includes a subject entity, an object entity, and a relation between the subject entity and the object entity. The plurality of entities extracted from the information sources includes the subject entity and the object entity. The decision support method for machinery control further includes constructing a knowledge graph (KG) based on the plurality of SPO triples. The KG includes a plurality of nodes corresponding to the plurality of entities extracted from the information sources, and a plurality of links corresponding to the plurality of relations between the plurality of entities. The decision support method for machinery control also includes predicting missing links between the plurality of nodes and adding the predicted missing links to the KG, and performing diagnostic and prognostic analysis using the KG, including analyzing plain text description of MCS situations to obtain the relevant information concerning key components from KG, recognizing the sensor observations and component conditions to diagnose the situation of other related components and providing the prognostics by analyzing the present trending/symptom in MCS operating process.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

The present disclosure provides a KG-based decision support system including a decision support method and a decision support apparatus for machinery control system (MCS). A knowledge graph (KG)-based MCS reasoning engine is provided with a capability that allows an operator to have a more comprehensive view of their present situation. The knowledge graph (KG), also called graph-structured knowledge bases (KBs), stores facts by describing entities and their relations with a unified representation of knowledge from various resources and facilitates advanced learning algorithms to predict potential links between identifiers and hidden attributes of entities. The KG is therefore used for storing knowledge and providing support for decision making. The disclosed methodology can be extended to different application areas.

Figure 1:
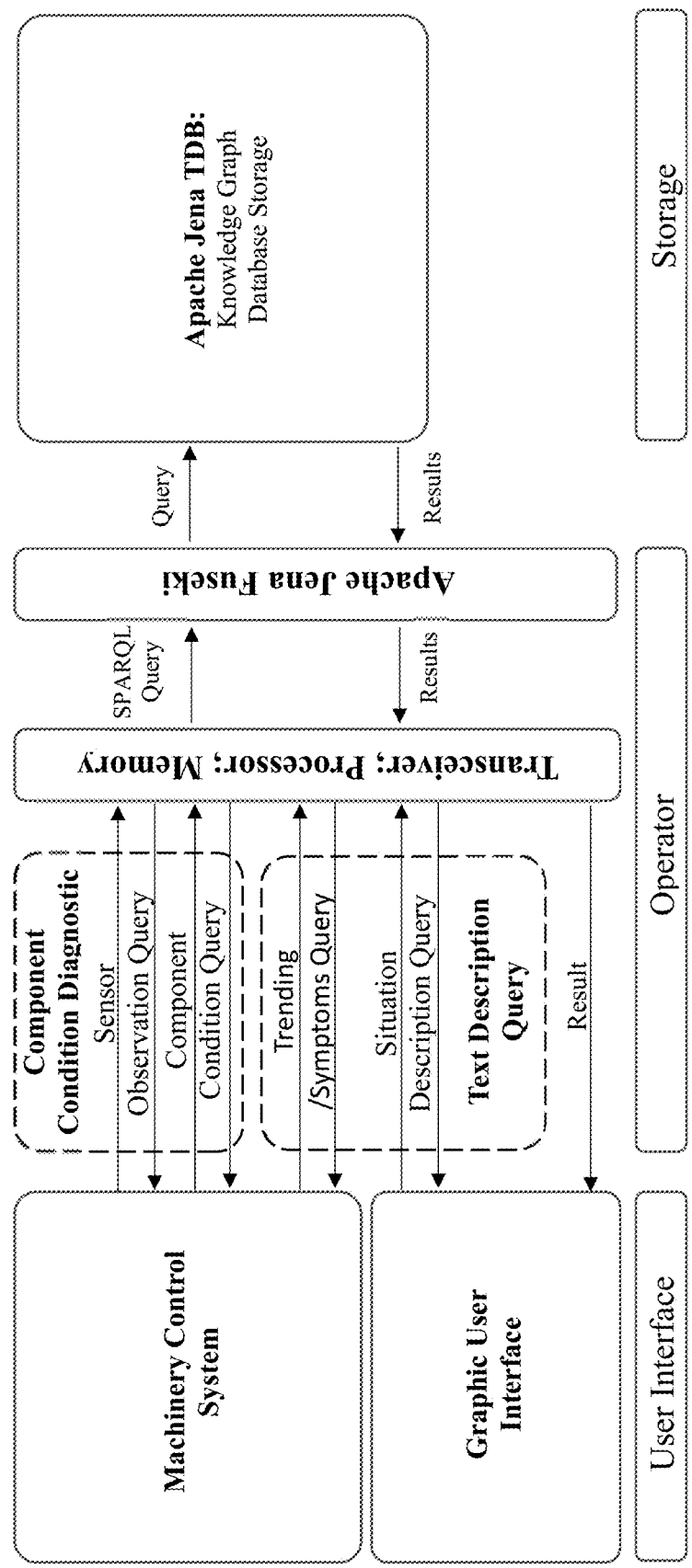
FIG. 1 illustrates a schematic diagram of the architecture of the disclosed decision support system cooperating with MCS.

FIG. 1 shows the architecture of the system cooperating with a MCS. Three portions are included in this cooperation: User Interface, Operator and Storage. Users could interact with the disclosed system through provided graphic user interface (GUI) or the MCS. The system receives the device information, like material trending/symptom or sensor and indicator observations, from the MCS and obtains the user inputted text description from the provided GUI. A transceiver in the operator may convert the input observations or text description into a predefined format. The sensor observation input or component conditions input may be mapped into different sensor groups depending on their relevant components in the MCS and further construct observation vectors. The text inputs, including user text descriptions and MCS material trending/symptoms, may be processed by computer-executable instructions in memory to generate keywords. After the conversion, a SPARQL query compiler in a processor may process these data and generate corresponding SPAQRL queries for further transition by Apache Jena Fuseki to obtain target information from knowledge base. Consistent with different types of input data, different queries are implemented in different processes whose details will be discussed in following sections. The knowledge graph database is stored via Apache Jena TDB which is a Jena component for RDF storage. A TDB database including node tables, triple/quad indexes and prefix tables offers a stable performance on efficient data query and an automatic protection against data corruptions under most circumstances. The queried results may be analyzed by the operator that further generates the most reasonable suggestion or relevant information displayed on GUI supporting user decision making.

The disclosed decision support method may first include a knowledge representation process. In one embodiment, the knowledge representation process may include extracting entities, identifying relations between entities, eliminating redundant relations, and performing entity resolution.

In a KG reasoning system, the KG encodes information and facts using entities and their relations. For illustrative purposes, subject-predicate-object (SPO) triples following the standard World Wide Web Consortium (W3C) Resource Description Framework (RDF) are taken as examples to represent the existence of facts. The subject and object are named entities while the predicate describes the relations between the entities. Depending on the relationships, entities could be interconnected to each other. Therefore, a sizable graph can be constructed from a large number of triples extracted from various unstructured or structured sources. It should be noted that different kinds of entities' attributes and entities' mutual relations can be defined according to the characteristics of the KG and requirements of the system. In the following, the basic procedure for building a KG is described in detail.

As an essential step of information extraction, Named-Entity Recognition (NER) aims to locate and classify entities from documents into pre-defined categories such as locations, things, persons, and the names of organizations. NER systems are developed using statistical models or linguistic grammar-based techniques. In many cases, statistical NER systems are labor-intensive and require a large amount of training data to be manually annotated. Semi-supervised approaches have been proposed to reduce part of the heavy annotation effort, however, they usually produce less accurate results.

There are three standard approaches to NER. The first type of approach is based on manually designed regular expression and the second approach is to build classifiers on a large training dataset, such as the generative classifier using Naïve Bayes net. Instead of predicting a single label for a single data sample, the third approach relies on building context sequence models which take context into consideration and label the essential elements according to the described scenario. Some of the most popular context sequence models include Hidden Markov Model (HMM), Conditional Markov Model (CMM), and Conditional Random Fields (CRFs). In many cases, sequential modeling produces the NER labels with relatively higher generalizability and scalability.

In addition to the collection of entities, another critical step is to explore and identify the relations between them. The task of Relation Extraction (RE) is to detect and classify the semantic relationships between named entities within a set of text/documents. The conventional approaches of extracting relations may be similar to NER approaches, i.e., either using a regular expression to associate entities with relations, or building classifiers based on training data. However, there are other non-traditional types of relations between entities or non-entities, which could be critical to the pattern discovery or anomaly detection. This is the task of Open Information Extraction (Open IE). Open IE aims to extract relation propositions from the plain text without using pre-defined ontology or schema. The established relation in many cases is the link between two arguments. The present disclosure focuses on the discovery of subject-predicate-object (SPO) triples from free texts for relation extraction, identification, and confirmation, where subject and object are not restricted to be entities discovered by NER and the predicate represents any relation between them.

Open IE tends to produce many redundant relations (SPO triples) and identity noises for the same set of entities. It may be necessary to eliminate redundant triples and resolve identity uncertainty to develop a scalable and credible KG. The present disclosure provides a relation reduction algorithm to eliminate the redundant candidate SPO triples. This algorithm mainly focuses on the part-of-speech (POS) tags of the words in the triples. POS-tag based rules may be defined to classify composite sentences from single sentences. The most concise simple SPO triple may be selected to represent the relation between subject and object in a given sentence. In addition, the original word in the selected triple may be replaced with its corresponding lemmatized form to reduce the noises caused by verb tenses or singular vs. plural nouns.

Entity resolution is a process of identifying and grouping different manifestations of the same real-world objects from various sources. It aims to link and group different entity mentions for the same underlying entity. It is very important to reduce the noises caused by this type of identity duplications for constructing a proper KG. In one embodiment, the entity resolution may be partially performed in a manual manner and the clutter of information produced by multi-representation of the same word or entity may be largely decreased. Therefore, the final SPO triples may be more representative for the MCS domain.

The disclosed decision support method may further include a knowledge graph construction and learning process. In one embodiment, the knowledge graph construction and learning process may include constructing a knowledge graph and performing knowledge graph learning and prediction.

Knowledge graphs (KGs) can be considered as KBs that model and store information in the form of entities and their relations using a graph structure. There are typically two assumptions regarding KGs. With a Closed World Assumption (CWA), any relation that is not represented by existing triples is considered false. However, a non-existing triple is interpreted as unknown under the Open World Assumption (OWA). In one embodiment, OWA may be adopted since KGs are known to be very sparse and incomplete. KBs are typically constructed using the four different methods described in Table 1.

In one embodiment, a domain-specific KG with facts represented by standard SPO triples extracted from unstructured data and expert knowledge may be developed. With relation elimination and entity resolution, subjects and objects are entities which are represented as nodes, while the relationships between entities are regarded as edges (links) in the graph.

Figure 2:
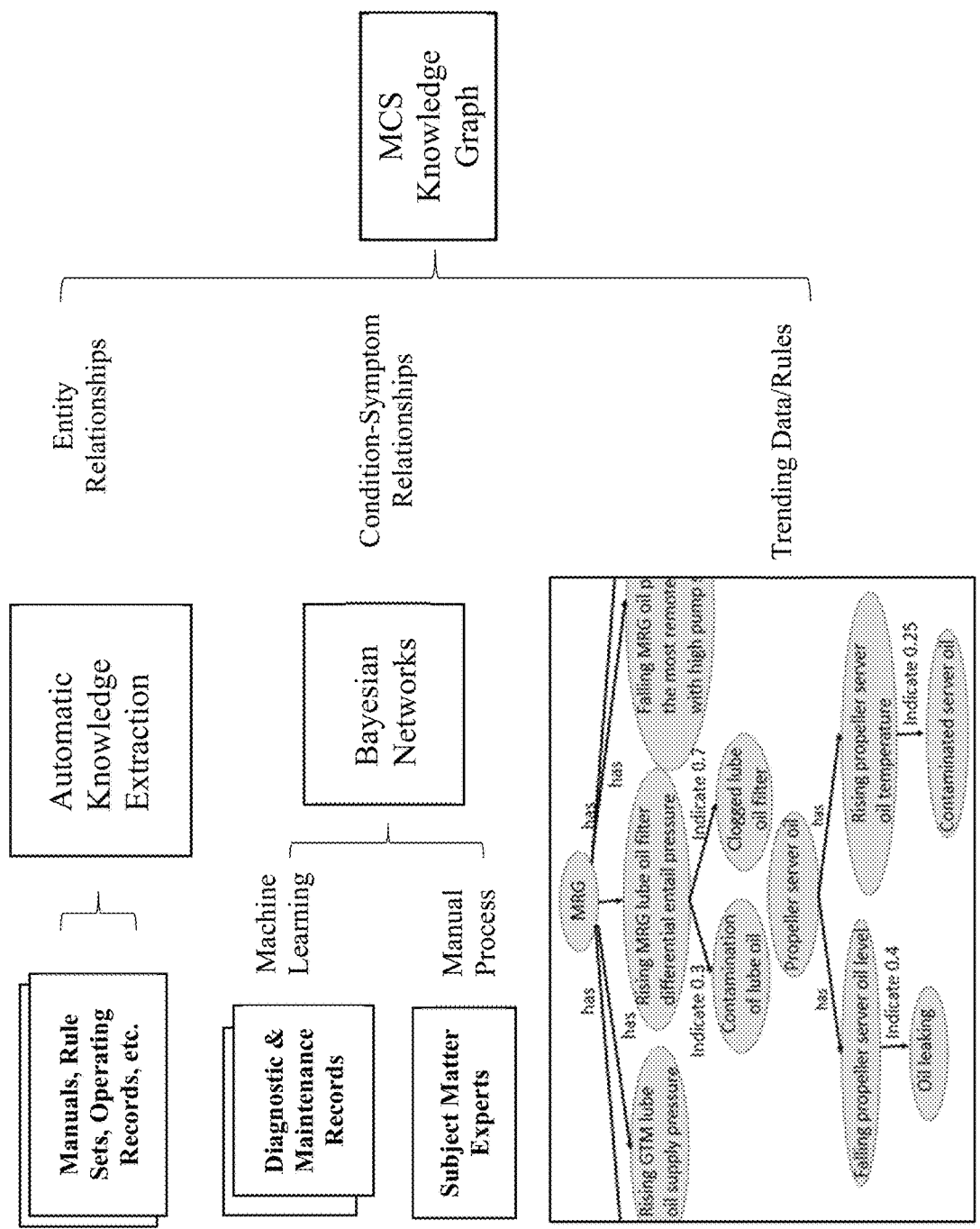
FIG. 2 illustrates a schematic diagram of an exemplary process for constructing a machinery control system (MCS) knowledge graph database (KGDB) according to various embodiments of the present disclosure.

For the MCS, KG construction may include three types of processes: converting static knowledge from technical manuals and operation records, compiling historical trending data/rules (i.e., trending-symptom rules) for prognostics, and gathering domain knowledge from subject matter experts (SMEs) for dynamic and noisy information regarding condition-symptom relationships. FIG. 2 shows the MCS KGDB construction process.

TABLE 1

Knowledge graph construction

| Methods | Triple Creation Methods | Examples |
|---|---|---|
| Curated | Manually developed by a group of experts | WordNet, UMLS |
| Collaborative | Manually generated by a group of collaborative volunteers | Wikidata, Freebase |
| Automated Semi-Structured | Automatically extracted from semi-structured text via hand-crafted or learned rules | YAGO, DBPedia, Freebase |
| Automated Unstructured | Automatically extracted from unstructured text using natural language processing or machine learning techniques | NELL, DeepDive |

Figure 3:
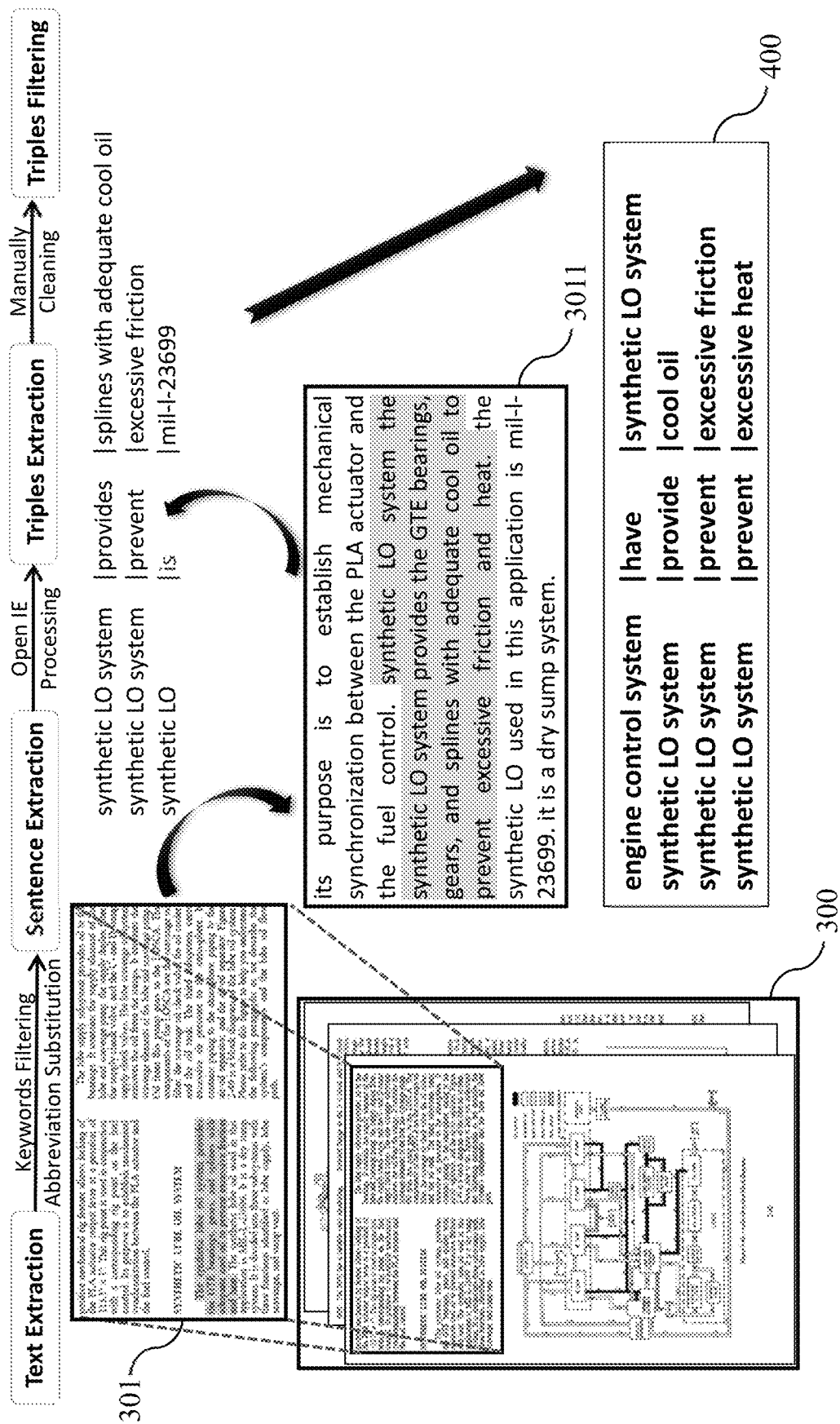
FIG. 3 illustrates a schematic diagram of an exemplary procedure for automatic knowledge extraction according to various embodiments of the present disclosure.

In one embodiment, the MCS system on a DDG-51 class ship is taken as an example for illustration. After an extensive open source search, a few key technical documents related to the DDG-51 propulsion and electrical systems may be located. Moreover, an LM2500 gas turbine operations and maintenance manual may also be acquired from the shore-based gas turbine electrical industry. To scope the effort, the focus may be placed on extracting information from the technical documents for propulsion and electrical systems, the two most critical and complex machinery control systems aboard a ship. The extracted information may be stored in the form of triples for KG construction. The procedure to extract such a graph is described in FIG. 3. Referring to FIG. 3, in one embodiment, a technical document 300 may include multiple pages of instructions including figures, tables, text descriptions, etc. During the automatic knowledge extraction (referring to FIG. 2) process, the content of the technical document 300 may be broken into different text sections for processing. For example, keywords filtering and abbreviation substitution may be performed on a text section 301 of the technical document 300, such that sentences of interest 3011 may be selected for Open IE processing. The extracted information may further be cleaned and merged to obtain a set of triples 400.

Although the technical documents describe many details of the internal components of the engineering plant and their interactions, most documents contain extraneous information that produced significant noise during triples extraction. To reduce the scope of document searching, a list of 'significant assemblies' including 200 MCS components may be compiled. During triple extraction, only the context containing a 'significant assembly' would be used as the source document and all components are indicated as their abbreviations to decrease the text noise and the complexity of phrases embedding. The source documents may then be processed by Open IE that splits the single sentence into several entailed clauses which are further decomposed into shorter fragments and the fragments are finally divided into a triple pattern as the outputs.

Cleaning and merging relations may be involved to eliminate the noise in resulting triples. To improve the efficiency of the relations expression and increase the repetition of the predicate occurrence in a KG which could provide more opportunity for the model to learn and remember the usage of this predicate during training, 11 predicates are designed to summarize all the relation in SPO triples extracted from text documents, like manuals. Table 2 shows the definition of these predicates and the examples extracted from the documents of the MCS system on a DDG-51 class ship.

Cleaning and merging entities may be involved to eliminate the noise in resulting triples. Because of the complexity of the MCS system, different assemblies might have the same components but in different modules. For instance, the triple "<compressor><have><stator>" shows that the compressor of generator turbine has a stator component, while another triple "<IGV><have><stator>" shows IGV (inlet guide vane) also has a stator component. However, these two stators with the same expression are different parts of the ship. To avoid the confliction of this kind of situation, the expression of the entities should be changed, like the triples above were modified as "<compressor><have><compressor stator>" and "<IGV><have><IGV stator>". Two more triples "<compressor stator><be><stator>" and "<IGV stator><be><stator>" were added to indicate the categories of the two entities "<compressor stator>" and "<IGV stator>".

TABLE 2

Definitions of Regulated Relations

| Relation | Definition | Example |
| --- | --- | --- |
| affect | The working of entity A affects entity B. | <GG turbine><affect><GG power> |
|  | Entity A affects the working of entity B. | <GG speed><affect><VSV> |
| be | Entity A is identical to entity B. | <fuel flow><be><fuel> |
|  | Entity A is a kind of entity B. | <T2><be><temperature signal> |
|  | Entity A has quality of entity B. | <GTGs base><be><steel frame> |
| cause | Entity A causes entity B to happen. | <speed correction><cause><CIT decrease> |
| connect | Entity A is physically linked to entity B. | <PT><connect><reduction gear> |
| for | Entity A is used for entity B. | <CRP propeller><for><change direction of the ship> |
| have | Entity A has entity B as a component. | <auxiliary system><have><air system> |
|  | Entity A has entity B as a status of entity A. | <ignition system><have><ignition system on> |
|  | Entity A has entity B as a property. | <PT><have><PT speed> |
| locate | Entity A locates at entity B. | <excess fuel><locate><LP side of pump> |
| prevent | Entity A prevents the occurrence of entity B. | <lip-type seals><prevent><oil leaking> |
| require | Entity A require entity B. | <combustion><require><airflow> |
|  | The working of entity A requires entity B. | <gear><require><LO> |
| respond | Entity A responds to the working of entity B. | <cooling system><respond><PACO> |
| solve | Entity B solves Entity A. | <shaft vibration><solution><stop and lock shaft> |

TABLE 3

The Summary of the Subsections in Propulsion System

| Connected Component | Sensors | Number of Classes |
| --- | --- | --- |
| Shaft1 | ShaftBearing1; ShaftBearing2; | 8 |
| Propeller1 | PropellerOilTemp; PropOiltankTemp; PropOilTankLvl; ShipSpeed | 24 |
| OilPress | FilterPress; Service Pump1Spd; ServicePimp2Spd | 33 |
| MRG1 | BearngTemp1; BearngTemp2; BearngTemp3; BearngTemp4 | 7 |
| LubeOilSYST | LubeOilTemp; LOCoolerInTemp; LOCoolerOutTemp; LOSumpLvl | 25 |
| FuelSvc | FilterPress; ServicePump1Spd; ServicePump2Spd | 17 |

Figure 4:
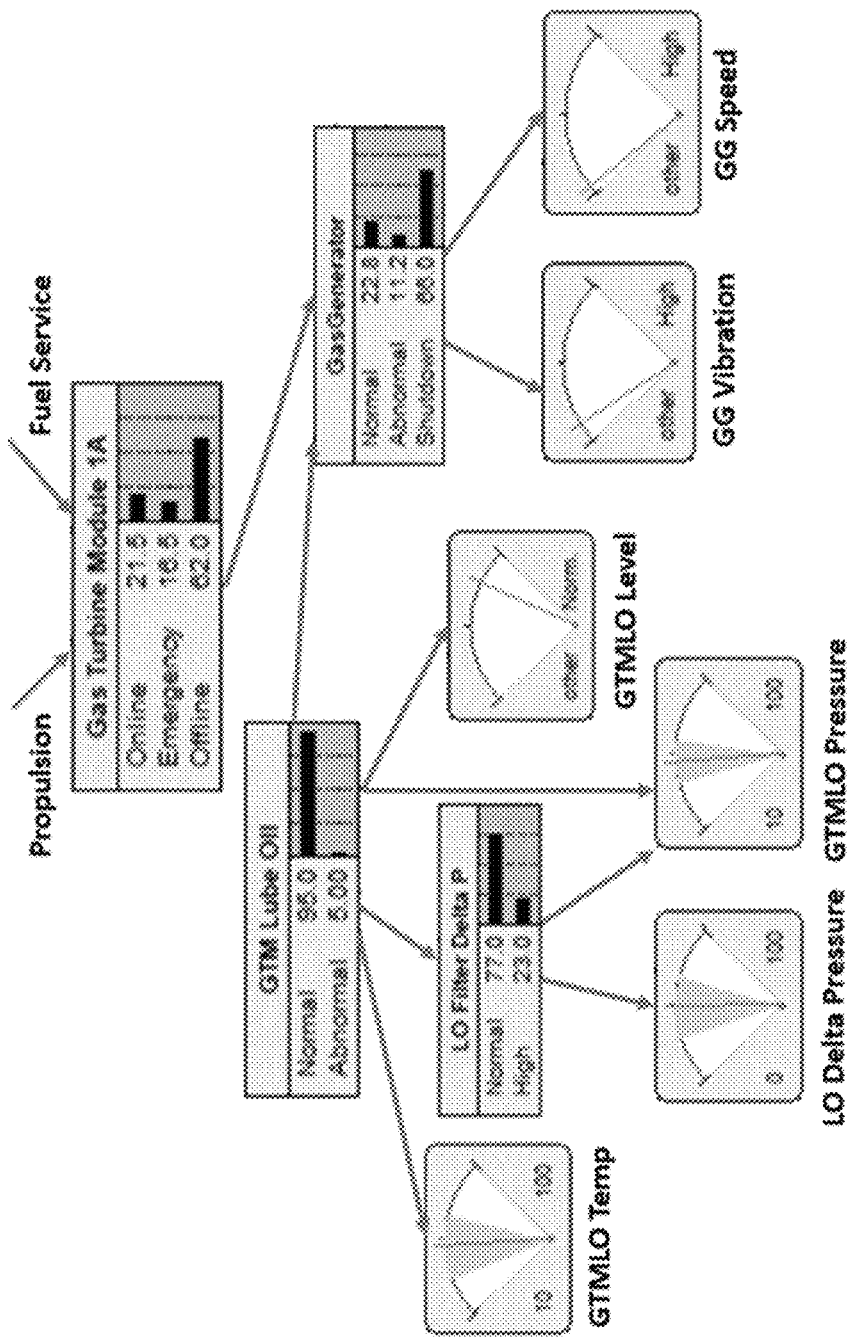
FIG. 4 illustrates a schematic diagram of an exemplary model of the Bayesian Network (BN) for a gas turbine module according to various embodiments of the present disclosure.

To model the dynamic nature of the engineering plant, a probabilistic graphical model may be used to incorporate expert knowledge, more specifically, a Bayesian Network (BN). This BN model may encode the domain knowledge including condition-symptom relationships of different plant components and sensors which can also be used to produce simulated data for pattern learning to construct probabilistic KG. The simulated data may be analyzed by a K-Prototype algorithm to classify the features of sensor observations. For example, the propulsion system may be divided into six subsections and the components conditions with relevant sensor readings in different subsection could be considered separately. The data in one group may make up an observation vector. More than six thousand records were simulated and the numbers of classes with significant features in sensor readings for the six components are obtained by K-Prototype are shown in Table 3:

The mean point in each class may be compiled into the triple format and stored in the KG with corresponding probabilities as the features for the component conditions with significant sensor readings. For example, for component Propeller1, with the observed values of the sensor group [PropellerOilTemp, PropOiltankTemp, PropOilTankLvl, ShipSpeed] as [42.168, 32.321, Normal, Slow], the Propeller1 may be in the condition of Neutral with the probability of 0.989 and Positive Pitch with the probability of 0.011. The distribution of the components' statuses contained in the model may serve as a baseline for reference and comparison. FIG. 4 shows the fuel service portion of the BN (referring to FIG. 2) model for a gas turbine module.

Figure 5:
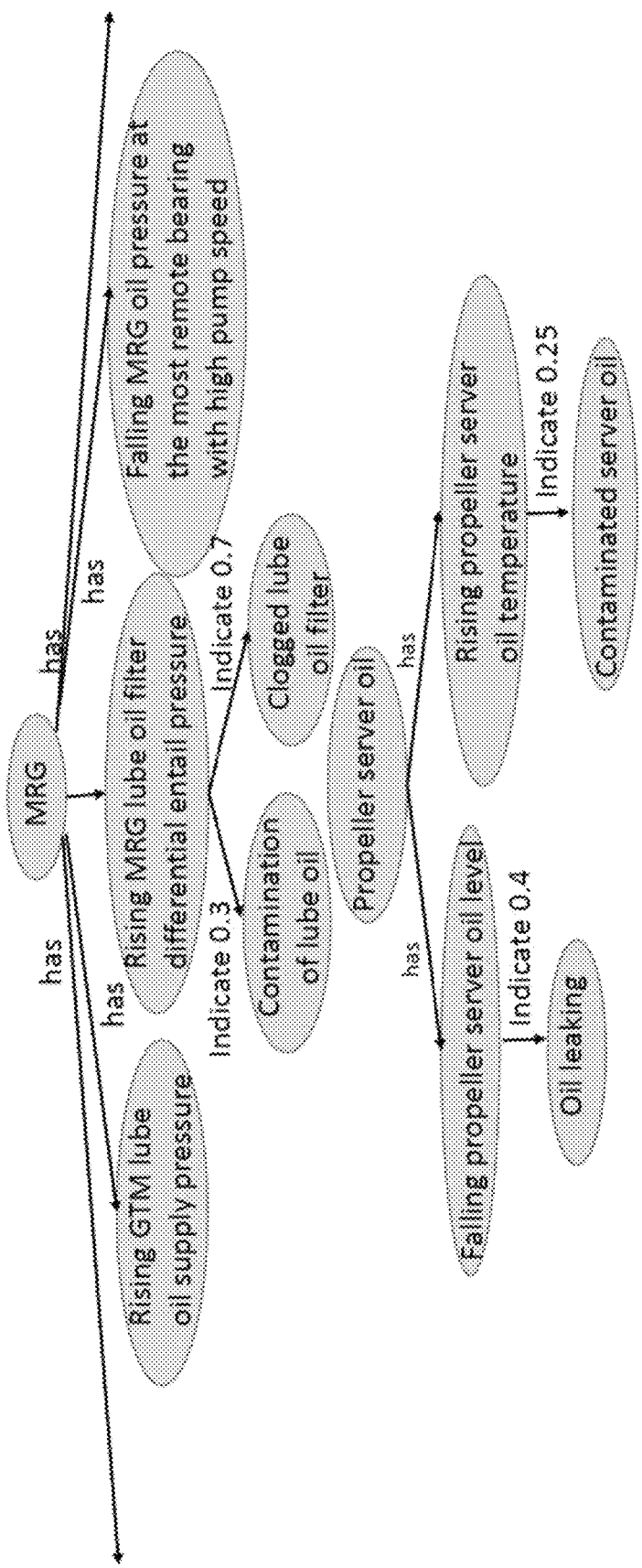
FIG. 5 illustrates a schematic diagram of trending-symptom rules according to various embodiments of the present disclosure.

In addition to the condition-symptom relationships, another important data for the prognostic purpose are the trending-symptom rules. FIG. 5 illustrates a schematic diagram of trending-symptom rules, and Table 4 shows some trending relationships developed for this purpose by the SME. For instance, referring to FIG. 5, a rising main reduction gear (MRG) bearing temperature, and low lube oil pressure at the most remote bearing may be an indication of debris in the MRG lube oil filter. This is because debris could cause the starvation of lube oil to the MRG bearings that would result in the bearings heating up and a low pressure reading at the most remote bearing. Furthermore, the filter differential pressure might also increase due to the debris.

TABLE 4

Example trending/symptom rules

| Indication | Node | Cause |
|---|---|---|
| Rising | MRG bearing Temp | Debris in MRG |
| Falling | LO Most Remote Bearing pressure | lube oil filter |
| Rising | LO Filter Diff Pressure | |
| Falling | GTM GG Speed | GTM PLA Failure |
| Falling | GTM PT Speed | |
| Falling | GTM PT Pressure | |
| Falling | Lube Oil sump level | Leak in LO sump |
| Falling | LO pressure | |

It should be noted that these rules are only for demonstration purposes at this point and may not be inferable based on the current KG models because the current models are not sufficiently detailed. Once the models are refined to a workable fidelity level in a future effort, the goal is to be able to conduct a prognostic analysis base on observed trending signals with a much higher resolution. However, it is difficult to gain information about the actual MCS operation and the influence of some physical object in a dynamic setting from the technical manuals, so that the trending rule is still encoded into KG. To do so, additional relationships may be added to build the linkage in KG. For example, a relation indicate is used to connect an observed trending to a possible cause with a value assessed by the SMEs representing the strength of the relation.

By nature, a KG is sparse, highly incomplete, and noisy. To overcome these issues, "statistical relational learning" (SRL) may be applied to predict missing links and identify relations between nodes. To describe the adopted SRL model, the following notations may be defined. For example, $E=\{e_1, \ldots, e_{N_e}\}$ may be used to denote the set of all entities, and $R=\{r_1, \ldots, r_{N_r}\}$ may be used to denote the set of all relation types in the KG. Possible triples may be defined as $x_{ijk}=(e_i, r_k, e_j)$ with binary random variable, $y_{ijk} \in \{0,1\}$, defined as, $$y_{ijk} = \begin{cases} 1 & \text{if the triple } (e_i, r_k, e_j) \text{ exists} \\ 0 & \text{otherwise} \end{cases} \quad (1)$$

According to the disclosed method, the goal is to predict new facts (unknown or hidden relations) given existing facts in a KG and to reason about the noisy "facts" extracted from various sources. The link prediction problem can be formulated using a probabilistic approach where each triple is assigned a probability of being true. The model may predict the existence of $x_{ijk}$ via a score function, $f(x_{ijk}; \theta)$. The score function may represent the confidence of the existence of the triple $x_{ijk}$ given the unknown parameters. More specifically, the link prediction problem can be formulated as an optimization problem by maximizing the log-likelihood function.

$$\max_\theta \sum_{n=1}^{N_d} \log B(y^n \mid \sigma(f(x^n; \theta))) \quad (2)$$

where $N_d$ is the number of observed triples, $\rho(\cdot)$ is the logistic function and B is the Bernoulli distribution given by $$B(y \mid p) = \begin{cases} p & \text{if } y = 1 \\ 1-p & \text{if } y = 0 \end{cases} \quad (3)$$

$\theta$ is the unknown parameters to be learned in the training process, and $f(\cdot)$ is the score function which can be defined based on different criteria. One popular approach called RESCAL is based on the bilinear model, $$f_{ijk}^{RESCAL} = e_i^T W_k e_j \quad (4)$$

where $e_i$ and $e_j$ are the latent feature representation of the entity $e_i$ and $e_j$, respectively, $W_k$ represents the bilinear weight matrix of relation $r_k$. It should be noted that Eq. (2) is based on the assumption that $y_{ijk}$ is conditionally independent given latent features associated with the entities.

It has been shown the RESCAL model is scalable for a large KG. Therefore, in one embodiment, the RESCAL model may be employed to predict potential relations between entities. For example, after the construction of the KG described above, the RESCAL model may be applied to predict the potential missing links.

Further, the disclosed decision support method may include a process of diagnostic and prognostic analysis using the knowledge graph.

To support decision making with the constructed KG, the query system, which builds the bridge between the user and the KG, may need to be designed. Overall, the obtained KG may be stored via Apache Jena TDB and provide services via Apache Jena Fuseki. The SPO triples are stored in RDF format on Apache Jena. The core concept of the RDF is the URL which is a single global identification system used in the Web. All the entities and relationships are expressed under the syntax rules of URL. Each URL begins with a scheme name (e.g. "http://") that refers to a specification for assigning identifiers within that scheme. As such, the URL syntax is a federated and extensible naming system wherein each scheme's specification may further restrict the syntax and semantics of identifiers using that scheme. As more and more fields create the ontologies to limit the complexity and organize information into data and knowledge, many vocabularies were published and could be used during the construction of the knowledge graph. However, since the limitation of available vocabularies, there is no existing one that could support the expression of the information about the internal structure and operation of navy vessels. To convert the extracted triples into RDF format, two new URL schemes vkel and vkrl are designed and created for the namespaces of the entities and relationships in the extracted triples. In addition, two existing ontologies were used to connect the name and the type of the entities. Table 5 shows the main ontologies used in the knowledge graph in RDF triple stores.

TABLE 5

The Ontologies Used in the Knowledge Graph in RDF Triple Stores

| Prefix | URL Schema | Example |
|---|---|---|
| foaf | http://xmlns.com/foaf/0.1/ | <http://xmlns.com/foaf/0.1/name> |
| rdf | http://www.w3.org/1999/02/22-rdf-syntax-ns# | <http://www.w3.org/1999/02/22-rdf-syntax-ns#type> |
| vkel | http://vessel.knowledge/element# | <http://vessel.knowledge/element#turbine_stator> |
| vkrl | http://vessel.knowledge/relationship# | <http://vessel.knowledge/relationship#respond> |

Based on the schemes above, the URL for each entity was created, and its name and type were stored as plain literals. For example, Table 6 shows a snapshot of the triples for the entity named "HP turbine".

TABLE 6

A Snapshot of the Triples Involved by HP Turbine

| Subject | Predicate | Object |
|---|---|---|
| http://vessel.knowledge/element#HP_turbine | http://xmlns.eom/foaf/0.1/name | "HP turbine" |
| http://vessel.knowledge/element#HP_turbine | http://www.w3.org/1999/02/22-rdf-syntax-ns#type | "Component" |
| http://vessel.knowledge/element#HP_turbine | http://vessel.knowledge/relationship#have | http://vessel.knowledge/element#HP_turbine_shroud |

In one embodiment, the diagnostic and prognostic analysis using the knowledge graph may be implemented through an information query. For example, the information query may be a general text query or a components condition query. In the following, the two different types of query may be described in detail.

In some embodiments, the information query may be a general text query which may receive the user text description or MCS material changing trending/symptom as the input. The natural language query system may search for relevant triple records based on the key points and essential words from an input text. To recognize the keywords from a text, a TextRank algorithm may be implemented by using the Python package summa. The TextRank algorithm may be a graph-based extractive summarization algorithm, and may not require any domain or prior knowledge since it summarizes the text content by considering the subsections of each sentence.

The traditional TextRank algorithm may regard each sentence as a node and the similarity between every two sentences as the score of the edge (link) between the nodes. One proposed similarity function for sentence X and Y may be the ratio of the number of the overlap words in both sentences to the sum of their lengths, which could be formalized as $$S(X, Y) = \frac{|\{w_i \mid w_i \in X \ \& \ w_i \in Y\}|}{\log(|X|) + \log(|X|)} \quad (5)$$

where $w_i$ indicates the word appearing in both sentence X and Y. A variation of the TextRank may be proposed to consider the longest common string as the objects in similarity comparison and a modified ranking function BM25 may be applied with a better performance.

The BM25 algorithm may be constructed based on TF-IDF, which is the abbreviation of term frequency-inverse document frequency. This statistic may reflect the importance of a word to a document in a collection or corpus. In the case of term frequency, $TF(t,D)=f(t,D)$ for term t in document D. The most straightforward choice may be using the raw count of the term t in document D, i.e., the number of the occurrence of term t in document D. The inverse document frequency may give the scale of how much information a term contains. It is the logarithm of ratio scaling the total number of the documents by the number of the documents containing the term. The IDF(t,A) for term t and document set A could be formalized as, $$IDF(t, A) = \log \frac{N}{|\{D \in A : t \in D\}|} \quad (6)$$

where N is the total number of document D in the set A and $|\{D \in A : t \in D\}|$ represents the number of documents where term t appears. Then, the TF-IDF of term t of document D in the set A is $$TFIDF(t,D,A)=TF(t,D)IDF(t,A) \quad (7)$$

In one embodiment, TFIDF weights the importance of a term in a collection of the text with a large documents volume. To better assist the evaluation between sentences, BM25 may modify the traditional TFIDF, and may be defined as, $$BM25(X, Y) = \sum_{i=1}^{n} IDF(y_i) \frac{f(x_i, Y) \cdot (k_1 + 1)}{f(x_i, Y) \cdot \left(1 - b + b \cdot \frac{|X|}{avgDL}\right)} \quad (8)$$

where k and b are the metric parameters, $y_i$ is the $i^{th}$ word in the sentence Y, and avgDL is the average length of the sentences in the collection. To avoid a possible negative value of the BM25 when a term appears in more than half of the documents in a collection, an adjustment may be applied to IDF formula:

$$IDF(y_i) = \begin{cases} \log(N - n(y_i) + 0.5) - \log(n(y_i) + 0.5) & \text{if } n(y_i) > N/2 \\ \varepsilon \cdot avgIDF & \text{if } n(y_i) \leq N/2 \end{cases} \quad (9)$$

with $\varepsilon$ is a value between 0.3 and 0.5 and avgIDF is the average IDF for all terms.

In the query system, the ranking statistics may be calculated for each of the two longest substrings in the input text. Considering the substrings as the nodes, the mutual ranking statistics may then be the weight of the edge (link) between two nodes. The node with higher ranked edges (links) may have a better chance to be selected as the summary of the input.

Figure 6:
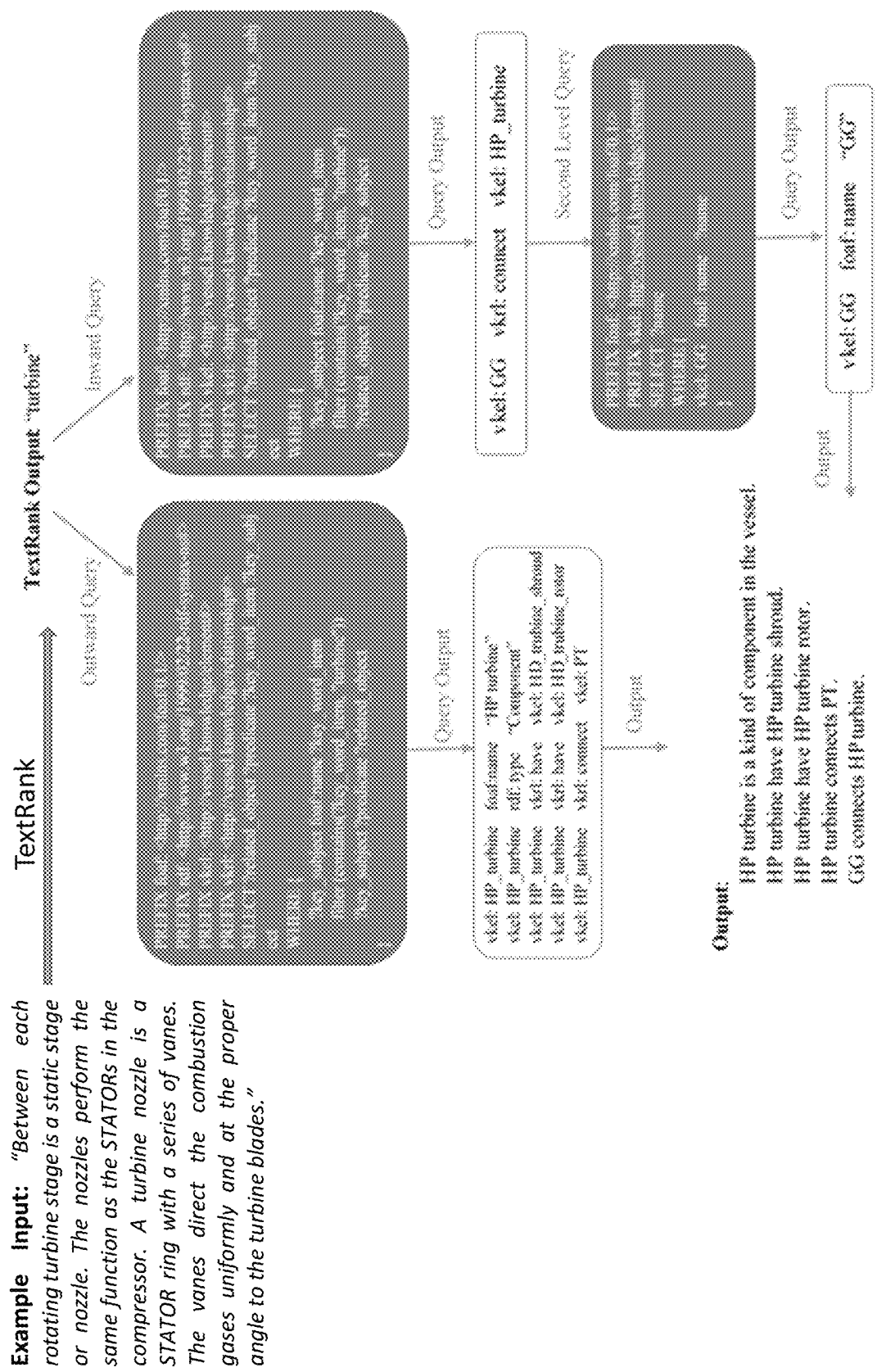
FIG. 6 illustrates a schematic diagram of an exemplary text query procedure.

For a query with natural language, the algorithm adopted in the present disclosure may use TextRank to target the relevant components the operator inquired. The process may automatically compile SPARQL query and an HTTP interface for server monitoring and administration. In this effort, Jena Fuseki may be used as a server backed by the obtained KG in the TDB storage. The triple records returned by the KGDB on Fuseki may provide the supporting material about the components and may also be transformed into the natural language to make the information readable by users. FIG. 6 shows an example of text query.

In some embodiments, the information query may be a components condition query which may receive component condition information or sensor observations as the input. The components condition query may return a diagnostic of the condition by analyzing given information of relevant components. The data backing up this query is the KG extracted from the BN model and domain experts. In one embodiment, information query may focus on the diagnostics of the propulsion system and the gas turbine module and could accept two types of data input: the sensor observations and the indicators of components conditions.

Figure 7:
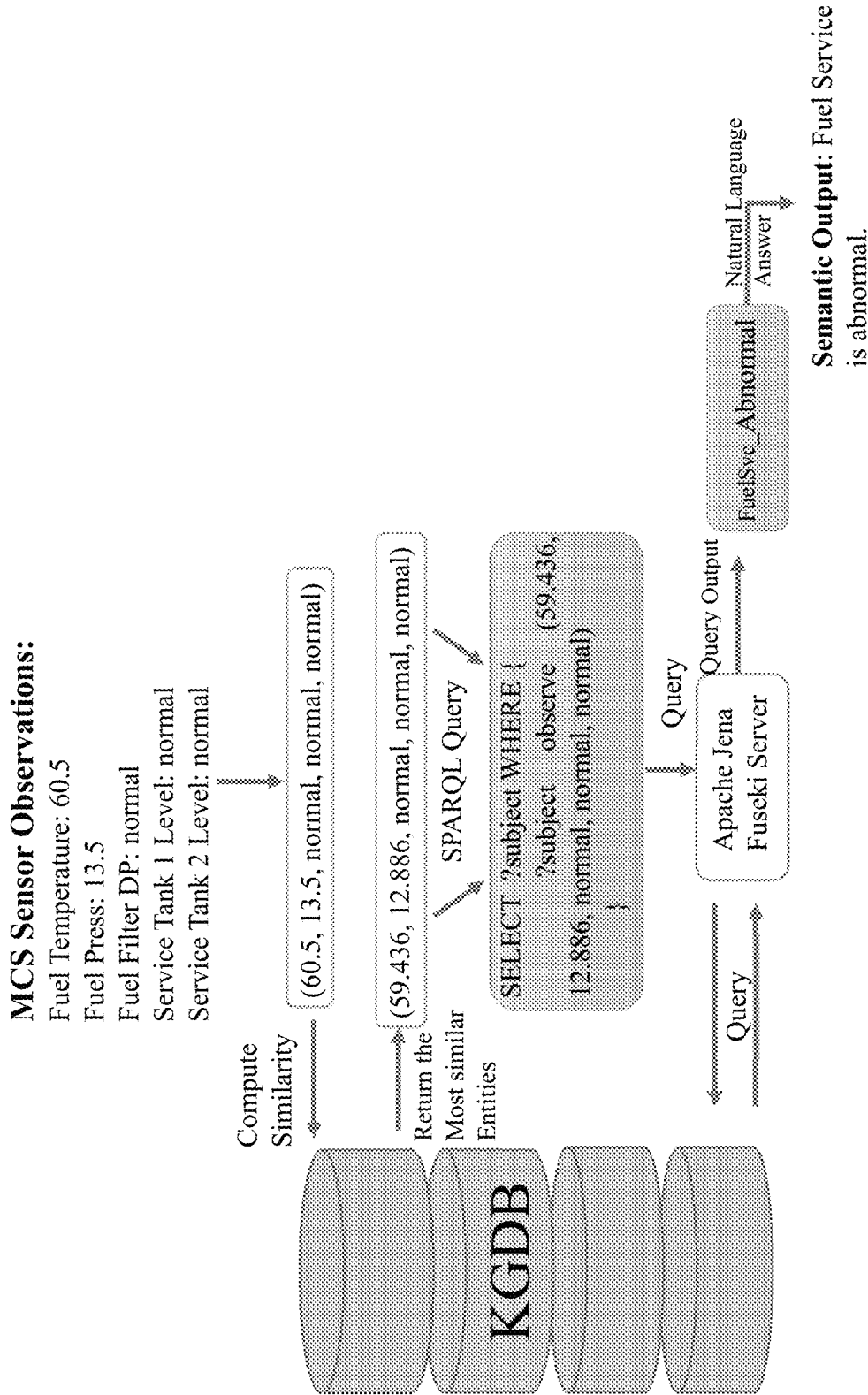
FIG. 7 illustrates a schematic diagram of an exemplary with sensor observation inputs.

For the sensor observations input, the query system may map the input data from different sensors to the relevant sensor groups. The data in different groups will be analyzed separately. The data in one group make up an observation vector which may be compared with the values of the mean points in different clusters obtained by training with simulated data though K-Prototype model and stored in the KG. The cluster having the least distance with the given observation may be selected as a starting point for predicting relevant components conditions. Based on the clusters' features in the record, the conditions of these components may be estimated and returned to users as the diagnostic result. FIG. 7 shows an example of query with sensor observation inputs.

Figure 8:
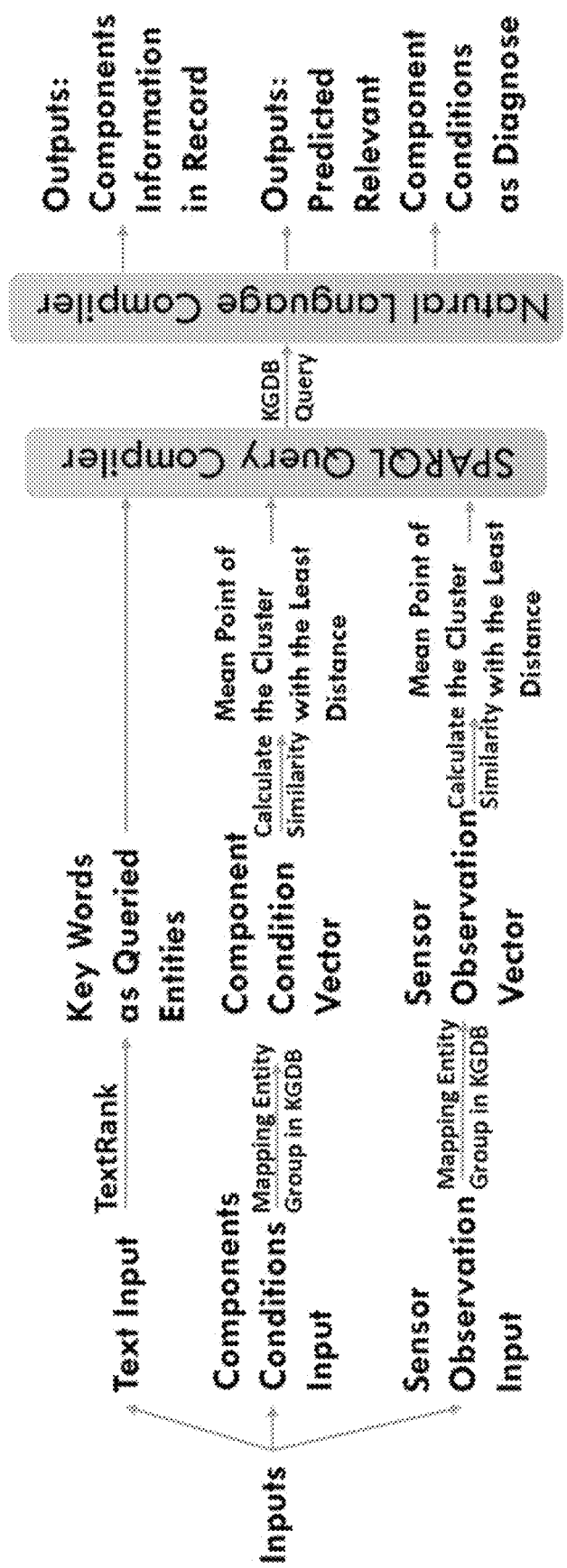
FIG. 8 illustrates a schematic diagram of an exemplary query process according to various embodiments of the present disclosure.

The analysis procedure of components conditions input may be similar to the analysis procedure of sensor observations except the measurement's similarity calculation is different. The system may directly locate the nodes of the given components in the graph and traverse the points within the scope. FIG. 8 shows the procedure of how the system processes different types of inputs and return the most relevant information according to the data in the knowledge graph.

In one embodiment, a case study was developed by the SME to test the developed system. The case study includes 8 diagnostic cases and 6 prognostic cases, and part of the corresponding results are presented in Table 7. The query results are validated against the known ground truth and the factual knowledge contained in the KGDB. The preliminary results show that the overall response accuracy (precision) is about 80% and the recall rate is about 70% for the test scenario.

For example, one of the diagnostic queries given in the test case #2 indicates that the "Lube Oil sump level" is "low" and the "LO pressure" is "low", while the system's response of "LubeOilSYST" is "Abnormal" with a probability of 0.866. However, the system could not precisely pinpoint the actual cause behind it, which is "Leak in LO Sump". This is a case of good precision but with a low recall rate.

Another example in the prognostic query given in the test case #4 indicates "Rising GTM Power turbine vibrations", the query system responds with a potential of "high-speed coupling misalignment with 0.4 probability" and "dirty lube oil with 0.4 probability". While the true cause "Dirty MRG Lube Oil" is not inconsistent with the answer, the system could not distinguish between the two potential causes it found. This is the case of a good recall rate but with low precision.

It should be noted that these simplified tests are merely for demonstration the purpose and may not be inferable based on the current KG models due to the low fidelity of the current models. Once the models are refined to a sufficiently workable level in the future effort, more detailed query analysis may be conducted based on observed signals with the rules encoded in the KG. Nevertheless, the current preliminary results of the case study indicate that the disclosed method has a good performance on recognizing the situation of the inner operation of MCS and shows encouraging sign for moving forward to the future work.

TABLE 7

Case study for components condition query

| Case | Node | Indication/ Numeric Reading | Query Result (with Probability) | |
|---|---|---|---|---|
| | | | Components Conditions Diagnostics | Related Triple Information |
| 1 | MRG Bearing Temperature | 105 | MRG1 Abnormal: 0.994; Shaft1 Windmill: 0.7; GTM1A1B1 | |
| | LO Most Remote Bearing pressure | Low | Emergency Emergency: 0.58; GTMLubeOil Abnormal: 0.777 | |
| | LO Filter Diff Pressure | High | | |
| 2 | Lube Oil Sump Level | Low | LubeOilSYST Abnormal: 0.866; OilPress Low: 0.8 | ('SSDG LO pressure low','respond', 'supply low press indicator') |
| | LO Pressure | Low | ('More than one possible clusters were found. More information is required, otherwise, current case will | ('LO pressure pump', 'have', 'lubrication system') ('SSDG LO pressure', 'respond', |

TABLE 7-continued

Case study for components condition query

| Case | Node | Indication/ Numeric Reading | Query Result (with Probability) | |
|---|---|---|---|---|
| | | | Components Conditions Diagnostics | Related Triple Information |
| | | | be classified as the first possible cluster') | 'supply press meter') |
| | Trending/Symptom | | Query Result (with Probability) | |
| 3 | Slow increase in lube oil cooler outlet temperature | | fouling of lube oil cooler tubes: 0.7 | |
| 4 | Rising GTM power turbine vibrations | | high speed coupling misalignment: 0.4; dirty lube oil: 0.4 | |

Further, the present disclosure also provides an apparatus. The apparatus may have the function of implementing the decision support method for machinery control described above. The function may be implemented through hardware by executing corresponding software. In a possible design, the apparatus may include: a processor, a transceiver, a memory, and a data storage. The memory may be used to store computer-executable instructions, the data storage is configured to store collected knowledge graph data, i.e. SPO triples dataset, the transceiver may be configured to realize communication between the apparatus and other communication entities, and the processor may be coupled to the memory through a bus. When the apparatus is operating, the processor may execute the computer-executable instructions stored by the memory, such that the apparatus can perform the decision support method supported by the knowledge base in data storage for machinery control described above.

Besides, a Graphic User Interface (GUI) was provided for users to interact with the query system. The two types of queries, components conditions query and text description query, were divided into four subsections. Each subsection was designed to receive different types of input from users.

The components conditions query was divided into two parts: Sensor Group Observation Diagnostic and Related Components Diagnostic. Sensor Group Observation Diagnostic receives the data of sensors measurements in the propulsion system and gas turbine module of the MCS. The sensors were distributed into six groups by their influence on different components. Accordingly, the Related Components Diagnostic query section receives the condition indicators of specific components. The output of the diagnostic includes the possible components condition and the corresponding predicted probability.

The text description query is also divided into two subsections: Trending Prognostics and Situation Description Query. These two sections allow users to type in the plain text as the input. Especially, the Situation Description Query could analyze any unstructured text input and return the most relevant information about the given situation.

According to the present disclosure, a decision support method and an apparatus for machinery control are provided. The method and the apparatus are developed based on the state-of-the-art probabilistic KG. The KG approach can incorporate various data fusion technologies for analysis of unstructured data and structured data for automated decision support and predictive capabilities. The resulting KG-MCS system according to the present disclosure has the potential to enhance state and situational awareness of machinery control operations for conditioned-based maintenance and real-time decision support.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed:

1. A decision support method for a machinery control system (MCS), comprising:
   extracting a plurality of entities from information sources;
   extracting a plurality of relations between the plurality of entities from the information sources;
   creating a plurality of subject-predicate-object (SPO) triples, wherein each SPO triple of the plurality of SPO triples includes a subject entity, an object entity, and a relation between the subject entity and the object entity, and the plurality of entities extracted from the information sources includes the subject entity and the object entity;
   constructing a knowledge graph (KG) based on the plurality of SPO triples, wherein the KG includes a plurality of nodes corresponding to the plurality of entities extracted from the information sources, and a plurality of links corresponding to the plurality of relations between the plurality of entities;
   designing new URL schemes vkel and vkrl for namespaces of the plurality of entities and the plurality of relationships in the extracted SPO triples;
   predicting missing links between the plurality of nodes and adding the predicted missing links to the KG; and
   performing diagnostic and prognostic analysis using the KG, including:
      analyzing plain text description of MCS situations to obtain relevant information concerning key components from the KG;
      recognizing sensor observations and component conditions to diagnose situations of other related components; and
      providing prognostics by analyzing a present trending and/or symptom in an MCS operating process.

2. The method according to claim 1, after obtaining the plurality of SPO triples and prior to constructing the KG, further including:
   eliminating redundant SPO triples from the plurality of SPO triples by designing a list of predicates which summarizes the relationships between the entities in the KG to reduces types of the plurality of links.

3. The method according to claim 1, after obtaining the plurality of SPO triples and prior to constructing the KG, further including:
 performing entity resolution to identify and group different representations of a same object in different sources.

4. The method according to claim 1, wherein extracting the plurality of entities from the information sources includes at least one of:
 determining entities based on manually designed expressions;
 determining entities based on classifiers built on a large training dataset; and
 determining entities based on context sequence models built to take context into consideration and label essential elements according to described scenarios.

5. The method according to claim 1, wherein creating the plurality of SPO triples includes at least one of:
 manually developing triples by a group of experts;
 manually generating triples by a group of collaborative volunteers;
 automatically extracting triples from semi-structured text via hand-crafted or learned rules; and
 automatically extracting triples from unstructured text using natural language processing or machine learning techniques.

6. The method according to claim 1, wherein:
 the missing links between the plurality of nodes are predicted through statistical relational learning (SRL).

7. The method according to claim 1, wherein:
 the diagnostic and prognostic analysis using the KG is implemented through an information query.

8. The method according to claim 7, wherein:
 the information query is a general text query, wherein the general text query searches for relevant triple records based on key points and essential words from an input text.

9. The method according to claim 7, wherein:
 the information query is a components condition query, wherein the components condition query returns a condition diagnostic by analyzing given information of relevant components.

10. A decision support apparatus for a machinery control system (MCS), comprising:
 a processor, a memory, and a data storage, wherein:
  the memory is configured to store computer-executable instructions;
  the data storage is configured to store a knowledge base including an SPO triples dataset; and
  the processor is coupled to the memory, and when the computer-executable instructions stored in the memory being executed, configured to perform a decision support method supported by the knowledge base in the data storage for machinery control, the decision support method including:
   extracting a plurality of entities from information sources;
   extracting a plurality of relations between the plurality of entities from the information sources;
   creating a plurality of SPO triples, wherein each SPO triple of the plurality of SPO triples includes a subject entity, an object entity, and a relation between the subject entity and the object entity, and the plurality of entities extracted from the information sources includes the subject entity and the object entity;
   constructing a KG based on the plurality of SPO triples, wherein the KG includes a plurality of nodes corresponding to the plurality of entities extracted from the information sources, and a plurality of links corresponding to the plurality of relations between the plurality of entities;
   designing new URL schemes vkel and vkrl for namespaces of the plurality of entities and the plurality of relationships in the extracted SPO triples;
   predicting missing links between the plurality of nodes and adding the predicted missing links to the KG; and
   performing diagnostic and prognostic analysis using the KG, including:
    analyzing plain text description of MCS situations to obtain relevant information concerning key components from the KG;
    recognizing sensor observations and component conditions to diagnose situations of other related components; and
    providing prognostics by analyzing a present trending/symptom in an MCS operating process.

11. The apparatus according to claim 10, wherein after obtaining the plurality of SPO triples and prior to constructing the KG, the method further includes:
 eliminating redundant SPO triples from the plurality of SPO triples by designing a list of predicates which summarizes the relationships between the entities in the KG to reduces types of the plurality of links.

12. The apparatus according to claim 10, wherein after obtaining the plurality of SPO triples and prior to constructing the KG, the method further includes:
 performing entity resolution to identify and group different representations of a same object in different sources.

13. The apparatus according to claim 10, further including:
 a transceiver configured to provide communication between the apparatus and other communication entities.

* * * * *